May 14, 1968
L. T. BOURKE
3,383,155
HEADGEAR-MOUNTED EYE PROTECTOR WITH
ANGLED-HINGED EYE SHIELDS
Filed June 10, 1965
3 Sheets-Sheet 1
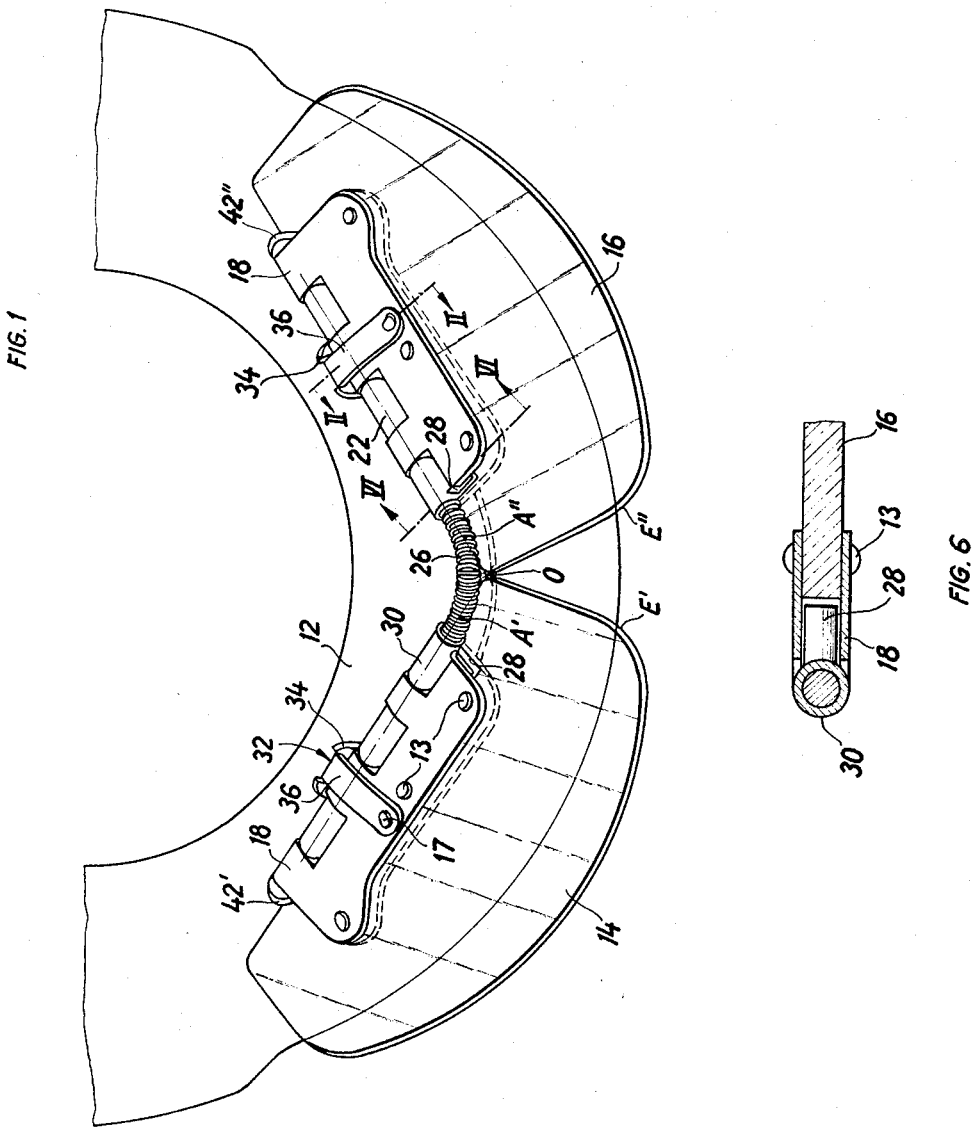
LESTER T. BOURKE
INVENTOR.
BY
Karl F. Ross
Attorney

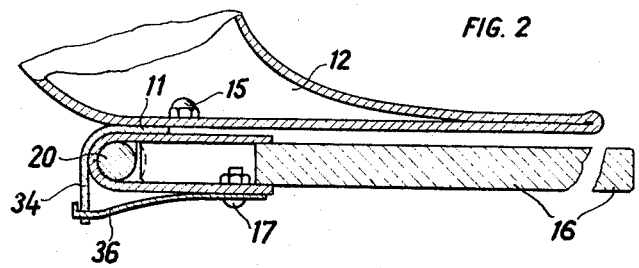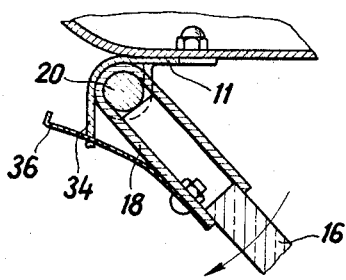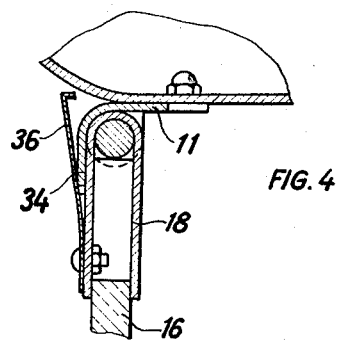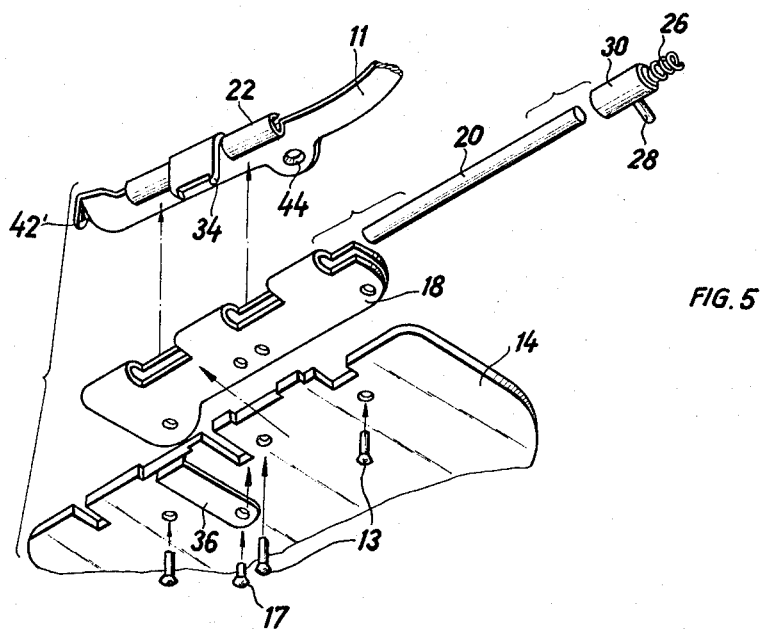

May 14, 1968
L. T. BOURKE
3,383,155
HEADGEAR-MOUNTED EYE PROTECTOR WITH
ANGLED-HINGED EYE SHIELDS
Filed June 10, 1965
3 Sheets-Sheet 3
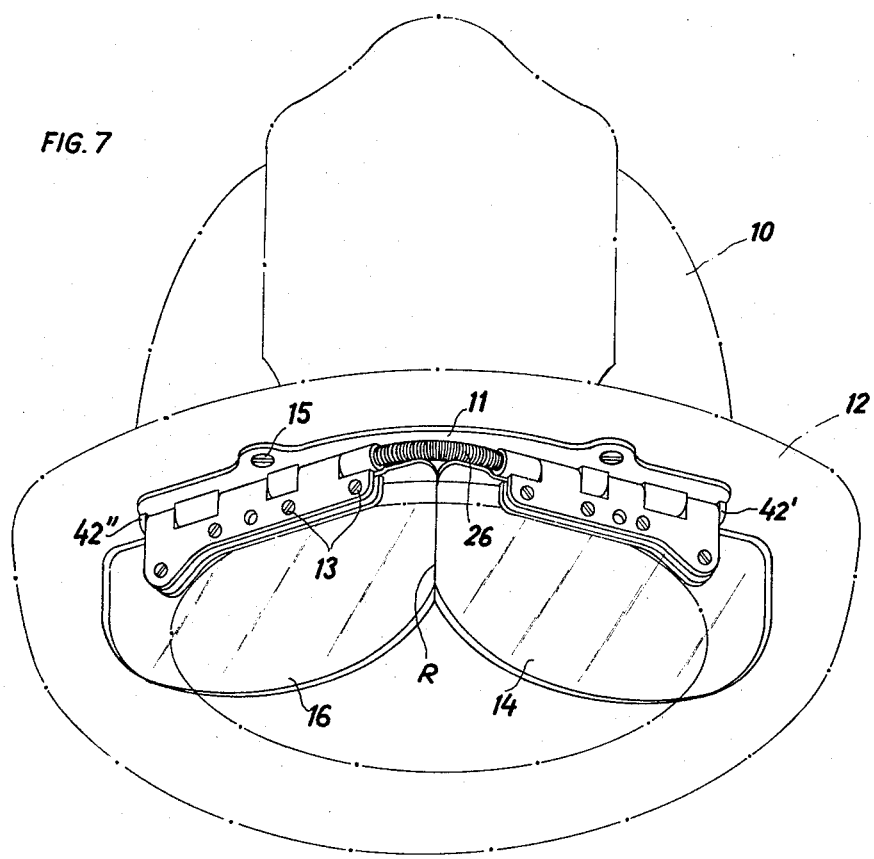
FIG. 7
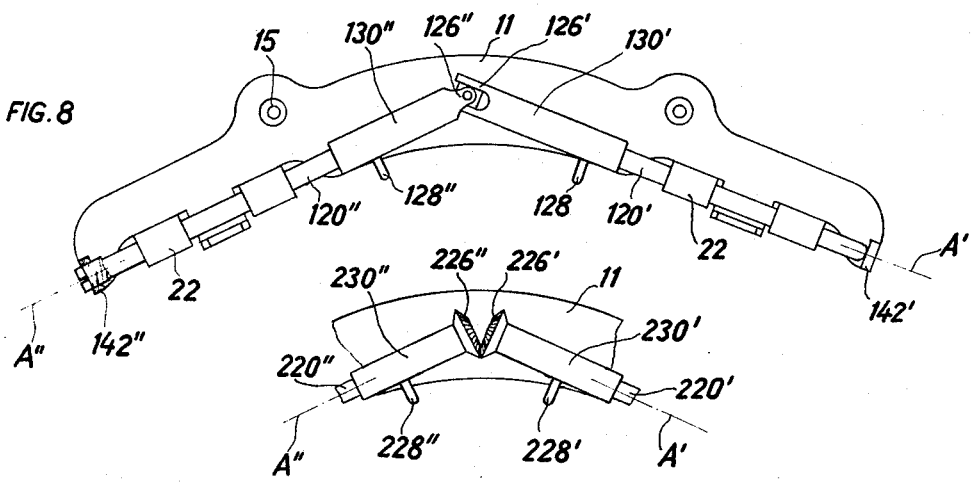
FIG. 8
FIG. 9
LESTER T. BOURKE
INVENTOR.
BY *Karl F. Ross*
Attorney

United States Patent Office 3,383,155
Patented May 14, 1968

3,383,155
HEADGEAR-MOUNTED EYE PROTECTOR WITH ANGLED-HINGED EYE SHIELDS
Lester T. Bourke, 74 Muffat St., Brooklyn, N.Y. 11207
Continuation-in-part of application Ser. No. 433,870, Feb. 19, 1965. This application June 10, 1965, Ser. No. 462,989
12 Claims. (Cl. 351—155)

ABSTRACT OF THE DISCLOSURE

The underside of a headgear visor is provided with two hinged lenses which are angularly coupled for joint rotation about their respective axes. When the lenses are in a folded position, the vertex of their axes is common to the angle formed between their proximal transverse edges. When the device is swung into an operative shield position, these proximal edges abut to form a dihedral viewing surface. A spring means is attached to the hinges for releaseably positioning the lenses.

---

This application is a continuation-in-part of my now abandoned application Ser. No. 433,870 filed Feb. 19, 1965.

My present invention relates to an eye protector comprising a pair of goggles adapted to be mounted on a fireman's helmet, welder's hat or other headgear in order to shield the eyes of the wearer from dust, glare and/or flying objects.

The general object of this invention is to provide an eye protector of this description which can be conveniently fitted onto any headgear having a forwardly projecting visor and which, when mounted on the underside of such visor, can be readily swung into an operative position in front of the eyes and a withdrawn position adjacent the visor surface.

A more particular object of my invention is to provide an eye protector of this type whose transparent shields or goggles, when operatively positioned, converge at an obtuse angle in front of the nose in order to deflect impinging fragments from the wearer's eyes and, in the case of a motorcycle rider, to reduce the air drag.

It is also an object of my invention to provide an eye protector whose two goggles or shields, though independently pivoted, may be jointly moved by the use of only one hand.

A further object of this invention is to provide an eye protector of this description whose shields can be mounted sufficiently forwardly on the visor to accommodate conventional eyeglasses without, however, objectionably extending beyond the visor in their withdrawn position.

The foregoing objects are realized, in accordance with my present invention, by the provision of two goggles or shields independently mounted on their common supporting surface (i.e. the underside of a visor) with freedom of rotation about respective axes which lie at an obtuse angle, e.g. preferably of approximately 120°, in a plane adjacent the visor surface so as to enable these two shields to be swung from a substantially coplanar withdrawr position next to that surface into a dihedral operative position in which these shields depend side by side from the visor so that their confronting transverse edges are in full contact with each other to give the effect of a unitary structure. For this purpose, each of the two transverse edges referred to is aligned with the point of intersection of the two axes of rotation, i.e. with the vertex of the angle included between these axes, so that said edges lie on a common radius through the vertex upon being swung down into contact with each other. In order to synchronize the swing of the two shields, I provide coupling means positively interconnecting them for joint rotation about their respective axes. Such coupling means, according to an advantageous embodiment, may include a flexible cable of the type used, for example, in automotive speedometers; other types of universal joints, such as a pair of articulated elements, or even a simple set of meshing bevel gears could be used instead.

Another feature of my invention relates to the provision of suitable indexing means for releasably retaining the shields in either of the two aforedescribed positions. The indexing means advantageously include a pair of leaf springs, one for each shield, and a pair of co-operating formations for stable engagement by the respective springs in each of the two positions. Thus, where the means for mounting the shields on the visor comprise two pairs of matingly intercalated hinge members, one of the springs may be rigid with one of the members while the co-operating formation may be a projecting lug on the other member.

The term "shield," in the present context, encompasses any goggle-type transparency, preferably of shatter-proof glass or hard plastic, including optically neutral glass plates as well as prescription-type lenses adapted to be used by the wearer in lieu of eyeglasses or as a supplement thereto. For certain uses, e.g. in welding, the shields are advantageously colored with a dark tint.

The above and other features of my invention will become more fully apparent from the following detailed description, reference being made to the accompanying drawing in which:

FIG. 1 is a perspective bottom view of an eye protector according to this invention, shown in retracted position on the visor of a fireman's helmet;

FIG. 2 is a fragmentary cross-sectional view taken on the line II—II of FIG. 1;

FIGS. 3 and 4 are fragmentary cross-sectional views similar to FIG. 2 showing one of the shields in an intermediate and in an extended position, respectively;

FIG. 5 is an exploded view of the mounting means serving to secure a shield to the visor;

FIG. 6 is a fragmentary cross-sectional view taken on the line VI—VI of FIG. 1;

FIG. 7 is a perspective front view of my improved eye protector in its operative position on a helmet shown in dot-dash lines;

FIG. 8 is a view generally similar to part of FIG. 1, showing a modified coupling; and FIG. 9 is a view similar to FIG. 8, showing a further type of coupling.

Reference will initially be made to FIG. 7 which shows a fireman's helmet 10 provided with a wide brim forming a visor 12. Mounted on the underside of this visor, by means of screws 15, is a curved metal strip 11 whereupon a pair of eye shields 14, 16 are swingably mounted. A flexible cable 26 interconnects the eye shields 14 and 16, in a manner more fully described hereinafter, for joint rotation about respective swing axes defined by two pairs of hinge members, each of these pairs consisting of a fixed member 22 rigid with strip 11 and a movable member 18 bracketing the respective shield to which it is secured by rivets 13.

As more clearly indicated in FIG. 1, the shields 14 and 16 are swingable about respective axes A', A" which include with each other an angle of approximately 120° and intersect in a point O constituting the vertex of this angle Aligned with this vertex O are the proximal transverse edges E', E" of the two shields which, therefore, include with each other a supplementary angle of approximately 60° (appearing reduced in the perspective view of FIG.

1). As a result of this arrangement, the two shields meet at a common radius R (FIG. 7) when moved into their extended position, thereby constituting a dihedral structure.

As is also apparent from FIG. 1, the shields 14 and 16 are hinged to the visor 12 at an intermediate location so chosen that these shields, in the coplanar position of FIG. 1, project only partly beyond the outer edge of the visor. In the dihedral position of FIG. 7, the shields are still sufficiently removed from the inner edge of helmet 10 to afford space for eyeglasses that may be worn by the user.

Each movable hinge member 18 has fastened to it, with the aid of a screw 17, a leaf spring 36 which bears upon a lug 34, integral with strip 11, and constitutes with it an indexing device generally designated 32 in FIG. 1. As best seen in FIGS. 2 and 4, spring 36 has a hooked end engaging in a bifurcate extension of lug 34 when the shield is retracted (FIG. 2); in the extended position of the shield, spring 36 lies substantially flat against the side of lug 34 (FIG. 4). In contradistinction to the intermediate position of FIG. 3, the positions of FIGS. 2 and 4 are both stable.

Reference will now be made to FIG. 5 for a more detailed description of the coupling means, including cable 26, serving to insure synchronized movement between the two shields 14, 16. As specifically illustrated in FIG. 5 for the shield 14, the hingle members 18, 22 thereof are traversed by a pin 20 having a projecting end received in a socket 30 having a stud 28 laterally projecting therefrom. Socket 30 is made rigid, e.g. by soldering, with the proximal extremity of cable 26 as best seen in FIG. 6; stud 28 comes to rest between the two flanges of the channel-shaped hinge member 18 so as to be positively connected therewith for joint rotation. By this means, therefore, cable 26 is firmly anchored to the two shields 14, 16 so that deflection of either of them from its withdrawn position into its operative position, or vice versa, will concurrently entrain the other shield into the same position.

FIG. 5 also illustrates one of the two mounting holds 44 on strip 11, serving for the passage of the screws 15, and further shows the presence of an abutment 42', at one end of the strip, to limit the outward displacement of pin 20. Another abutment 42" (FIG. 1) at the opposite end of the strip 11 is perforated, to facilitate disassembly of the coupling by withdrawal of the second pin, i.e. in a manner more fully illustrated in FIG. 8 for pin 120" and abutment 142".

In the modified arrangement shown in FIG. 8, the pins 20 traversing the two fixed hinge members 22 on strip 11 have been replaced by similarly shaped shafts 120', 120" recessed in tubular shanks 130', 130" of articulated elements 126', 126" constituting a universal joint; shanks 130', 130" carry respective coupling studs 128', 128". The construction is otherwise similar to that of the preceding embodiment. Pin 128" has a threaded and slotted end matingly inserted in a tapped hole of abutment 142", so as to be detachable with the aid of a screwdriver, whereas pin 128' merely bears upon its abutment 142'.

By way of further modification, I have shown in FIG. 9 a pair of hinge pins 220', 220" whose extremities, by the aid of sleeves 230' and 230" having studs 228', 228", support two meshing bevel gears 226', 226". As will be readily apparent, the joint motion of the shields 14, 16 (FIG. 7) remains the same upon replacement of the cable 26 by the coupling of FIG. 8 or FIG. 9.

Further modifications of the eye protector herein disclosed are, of course, possible without departing from the spirit and scope of my invention except as limited by the appended claims.

I claim:

1. An eye protector adapted to be mounted on a visor of a headgear, comprising two independent transparent eye shields; mounting means for securing said shields to a supporting surface on the underside of a visor with freedom of rotation about respective axes which lie at an obtuse angle to each other in a plane adjacent said surface, said shields having confronting transverse edges aligned with the vertex of said angle; coupling means positively interconnecting said shields for joint rotation about their respective axes from a substantially coplanar position adjacent said surface to a dihedral position in which said transverse edges abut each other along a common radius through said vertex; and indexing means for releasably retaining said shields in each of said positions.

2. An eye protector as defined in claim 1 wherein said mounting means comprises a pair of hinge members attachable to said supporting surface and a pair of pins respectively connected with said shields, said pins being journaled in said hinge members and joined to said coupling means.

3. An eye protector as defined in claim 2 wherein said coupling means comprises a flexible cable having extremities secured to said pins.

4. An eye protector as defined in claim 2 wherein said coupling means comprises a universal joint constituted by a pair of articulated elements respectively carried on said pins.

5. An eye protector as defined in claim 2 wherein said coupling means comprises a pair of meshing bevel gears respectively carried on said pins.

6. An eye protector as defined in claim 1 wherein said mounting means comprises two pairs of matingly intercalated hinge members, one hinge member of each pair being attachable to said supporting surface, the other hinge member being secured to a respective shield.

7. An eye protector as defined in claim 6 wherein said indexing means comprises a leaf spring on one hinge member and a co-operating formation on the other hinge member of each pair.

8. In a headgear having a visor projecting above the eyes of a wearer, the combination therewith of two independent transparent eye shields; mounting means securing said shields to a supporting surface on the underside of said visor with freedom of rotation about respective axes which lie at an obtuse angle of about 120° to each other in a plane adjacent said surface, said shields having confronting transverse edges aligned with the vertex of said angle; coupling means positively interconnecting said shields for joint rotation about their respective axes from a substantially coplanar and outwardly swung position adjacent said surface to a dihedral position in which said transverse edges abut each other along a common radius through said vertex; and indexing means for releasably retaining said shields in each of said positions.

9. The combination defined in claim 8 wherein said shields are disposed sufficiently forwardly on said visor to facilitate the use of eyeglasses by the wearer in said dihedral position.

10. The combination defined in claim 8 wherein said shields are plane.

11. The combination defined in claim 8 wherein said eye shields are prescription lenses.

12. The combination defined in claim 8 wherein said eye shields are darkly tinted.

No references cited.

DAVID H. RUBIN, *Primary Examiner.*

W. L. BROWN, *Assistant Examiner.*